(12) United States Patent
Biskeborn et al.

(10) Patent No.: US 10,796,718 B2
(45) Date of Patent: *Oct. 6, 2020

(54) MAGNETIC RECORDING APPARATUS HAVING CIRCUITS WITH DIFFERING TUNNEL VALVE SENSORS AND ABOUT THE SAME RESISTANCE

(71) Applicant: International Business Machines Corporation, Armonk, NY (US)

(72) Inventors: Robert G. Biskeborn, Hollister, CA (US); Robert E. Fontana, Jr., San Jose, CA (US); Calvin S. Lo, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/453,812

(22) Filed: Jun. 26, 2019

(65) Prior Publication Data

US 2019/0318761 A1    Oct. 17, 2019

Related U.S. Application Data

(63) Continuation of application No. 15/868,911, filed on Jan. 11, 2018, now Pat. No. 10,395,676, which is a
(Continued)

(51) Int. Cl.
*G11B 5/39* (2006.01)
*G11B 5/008* (2006.01)
*G11B 5/48* (2006.01)

(52) U.S. Cl.
CPC ........ *G11B 5/3909* (2013.01); *G11B 5/00826* (2013.01); *G11B 5/00878* (2013.01); *G11B 5/397* (2013.01); *G11B 5/4893* (2013.01)

(58) Field of Classification Search
None
See application file for complete search history.

(56) References Cited

U.S. PATENT DOCUMENTS

| 4,197,987 A | 4/1980 | Lazzari |
| 5,023,991 A | 6/1991 | Smith |

(Continued)

FOREIGN PATENT DOCUMENTS

| JP | 2000048324 A | 2/2000 |
| JP | 2006032717 A | 2/2006 |

OTHER PUBLICATIONS

Biskeborn et al., U.S. Appl. No. 15/377,790, filed Dec. 13, 2016.
(Continued)

*Primary Examiner* — William J Klimowicz
(74) *Attorney, Agent, or Firm* — Zilka-Kotab, P.C.

(57) ABSTRACT

An apparatus, according to one embodiment, includes a first circuit electrically coupled to a first read transducer and a first parallel circuit, the first read transducer having a tunnel valve structure having a resistance. A second circuit is electrically coupled to a second read transducer having a tunnel valve structure. An area of a tunnel barrier portion of the second read transducer along a plane of deposition thereof is larger than an area of a tunnel barrier portion of the first read transducer along a plane of deposition thereof.

19 Claims, 13 Drawing Sheets

Related U.S. Application Data continuation of application No. 15/622,357, filed on Jun. 14, 2017, now Pat. No. 10,014,014.

(56) References Cited

U.S. PATENT DOCUMENTS

| | | | |
|---|---|---|---|
| 5,175,938 A | 1/1993 | Smith | |
| 6,219,206 B1 | 4/2001 | Odai et al. | |
| 6,538,861 B1 | 3/2003 | Hayashi et al. | |
| 6,603,623 B1 | 8/2003 | Fontana, Jr. et al. | |
| 6,661,625 B1 | 12/2003 | Sin et al. | |
| 6,815,745 B2 | 11/2004 | Higo et al. | |
| 6,934,926 B1 | 8/2005 | Bogusch | |
| 7,102,859 B2 * | 9/2006 | Inage | B82Y 10/00 360/324.2 |
| 7,551,393 B2 | 6/2009 | Biskebom et al. | |
| 7,706,109 B2 * | 4/2010 | Nichols | G11B 5/6005 360/323 |
| 7,791,834 B2 | 9/2010 | Biskebom et al. | |
| 8,964,319 B1 | 2/2015 | Biskebom et al. | |
| 9,406,321 B2 * | 8/2016 | Kief | G11B 5/3964 |
| 9,449,622 B2 | 9/2016 | Biskebom et al. | |
| 9,576,597 B2 | 2/2017 | Trantham et al. | |
| 10,014,014 B1 | 7/2018 | Biskebom et al. | |
| 10,068,597 B1 | 9/2018 | Jury et al. | |
| 10,297,275 B2 | 5/2019 | Biskebom et al. | |
| 10,354,679 B2 | 7/2019 | Biskeborn et al. | |
| 10,395,676 B2 | 8/2019 | Biskeborn et al. | |
| 2002/0145835 A1 | 10/2002 | Suzuki et al. | |
| 2002/0159203 A1 | 10/2002 | Saito et al. | |
| 2003/0184921 A1 | 10/2003 | Sugita et al. | |
| 2004/0180608 A1 | 9/2004 | Church et al. | |
| 2005/0068684 A1 | 3/2005 | Gill | |
| 2008/0032158 A1 | 2/2008 | Sasaki | |
| 2008/0036455 A1 | 2/2008 | Beach et al. | |
| 2008/0100289 A1 | 5/2008 | Zimmer et al. | |
| 2009/0316290 A1 | 12/2009 | Biskebom et al. | |
| 2010/0084199 A1 | 4/2010 | Bucher et al. | |
| 2011/0181987 A1 | 7/2011 | Shiimoto et al. | |
| 2011/0261487 A1 | 10/2011 | Araki et al. | |
| 2012/0074978 A1 * | 3/2012 | Gentrup | G01R 29/0814 324/754.19 |
| 2012/0152891 A1 | 6/2012 | Brown et al. | |
| 2012/0287527 A1 * | 11/2012 | Biskeborn | G11B 5/50 360/46 |
| 2013/0100724 A1 * | 4/2013 | Venkataraman | G11B 5/02 365/145 |
| 2014/0063644 A1 | 3/2014 | Lou et al. | |
| 2014/0063646 A1 | 3/2014 | Biskebom et al. | |
| 2015/0255092 A1 | 9/2015 | Macken et al. | |
| 2015/0380027 A1 | 12/2015 | Contreras et al. | |
| 2016/0125897 A1 | 5/2016 | Biskebom et al. | |
| 2016/0125900 A1 | 5/2016 | Biskebom et al. | |
| 2016/0140989 A1 | 5/2016 | Chen et al. | |
| 2016/0202330 A1 | 7/2016 | Yamamoto et al. | |
| 2016/0238635 A1 | 8/2016 | Zimmer | |
| 2017/0200468 A1 | 7/2017 | Zhu et al. | |
| 2018/0166096 A1 | 6/2018 | Biskebom et al. | |
| 2018/0166098 A1 | 6/2018 | Biskebom et al. | |
| 2018/0211684 A1 * | 7/2018 | Biskeborn | G11B 5/3948 |
| 2018/0366148 A1 | 12/2018 | Biskebom et al. | |

OTHER PUBLICATIONS

Biskeborn et al., U.S. Appl. No. 15/469,322, filed Mar. 24, 2017.
Non-Final Office Action from U.S. Appl. No. 15/377,790, dated Jun. 2, 2017.
Biskeborn et al., U.S. Appl. No. 15/622,357, filed Jun. 14, 2017.
Restriction Requirement from U.S. Appl. No. 15/469,322, dated Sep. 7, 2017.
Notice of Allowance from U.S. Appl. No. 15/622,357, dated Dec. 11, 2017.
Final Office Action from U.S. Appl. No. 15/377,790, dated Dec. 15, 2017.
Biskeborn et al., U.S. Appl. No. 15/868,911, filed Jan. 11, 2018.
Non-Final Office Action from U.S. Appl. No. 15/469,322, dated Jan. 9, 2018.
Notice of Allowance from U.S. Appl. No. 15/622,357, dated Jan. 10, 2018.
Notice of Allowance from U.S. Appl. No. 15/622,357, dated Feb. 28, 2018.
Non-Final Office Action from U.S. Appl. No. 15/377,790, dated Mar. 26, 2018.
Non-Final Office Action from U.S. Appl. No. 15/377,790, dated Aug. 9, 2018.
Ex Parte Quayle from U.S. Appl. No. 15/469,322, dated Aug. 9, 2018.
Non-Final Office Action from U.S. Appl. No. 15/868,911, Nov. 13, 2018.
Notice of Allowance from U.S. Appl. No. 15/377,790, dated Nov. 15, 2018.
Notice of Allowance from U.S. Appl. No. 15/469,322, dated Jan. 9, 2019.
Final Office Action from U.S. Appl. No. 15/868,911, dated Feb. 13, 2019.
Notice of Allowance from U.S. Appl. No. 15/377,790, dated Feb. 26, 2019.
Notice of Allowance from U.S. Appl. No. 15/868,911, dated Apr. 23, 2019.
Supplemental Notice of Allowance from U.S. Appl. No. 15/868,911, dated Jun. 12, 2019.

* cited by examiner

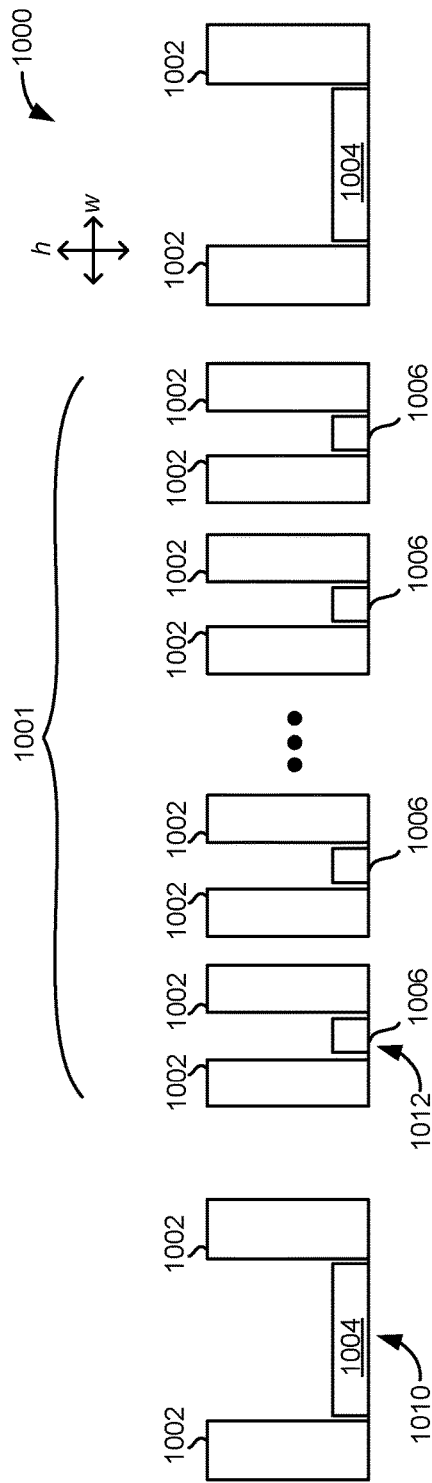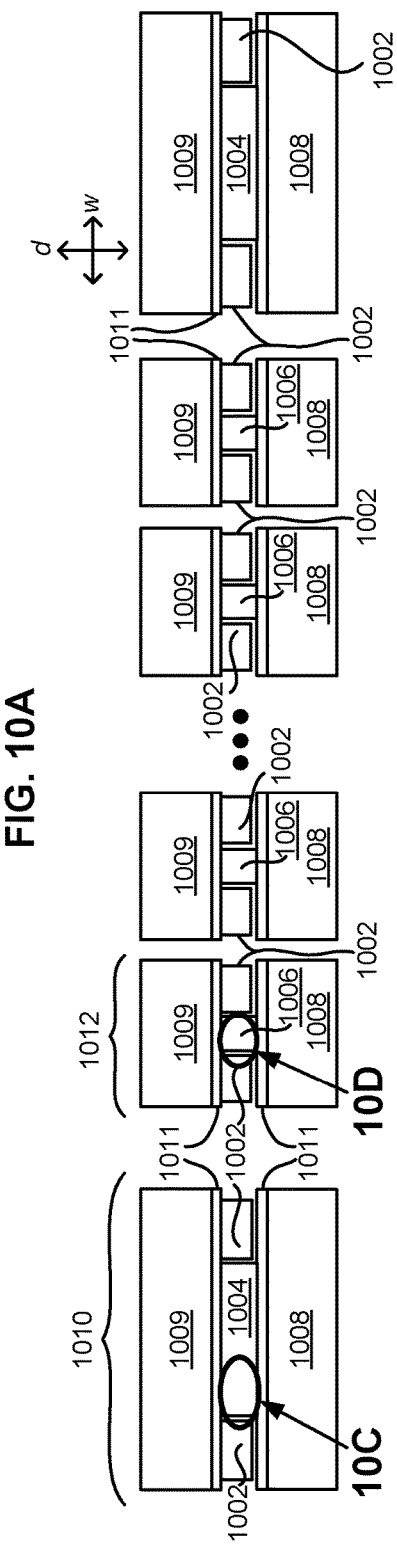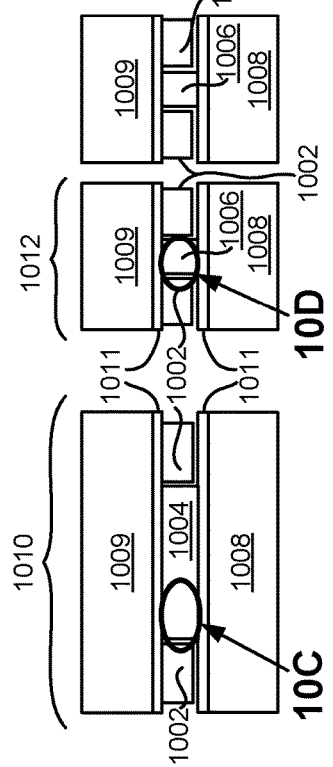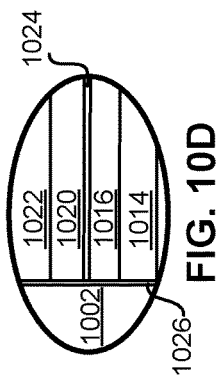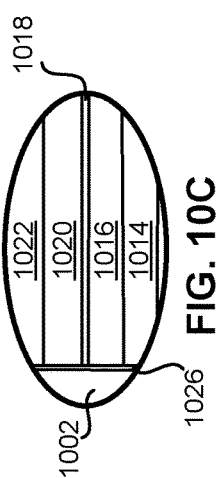
FIG. 10A
FIG. 10B
FIG. 10C
FIG. 10D

MAGNETIC RECORDING APPARATUS HAVING CIRCUITS WITH DIFFERING TUNNEL VALVE SENSORS AND ABOUT THE SAME RESISTANCE

BACKGROUND

The present invention relates to data storage systems, and more particularly, this invention relates to magnetic recording modules, in particular, magnetic recording modules having tunnel valve sensor circuits with similar resistances, but two or more of the tunnel valve sensors in the circuits have dissimilar tunnel barrier areas and thus different resistance values thereacross.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

An apparatus, according to one embodiment, includes a first circuit electrically coupled to a first read transducer and a first parallel circuit, the first read transducer having a tunnel valve structure having a resistance. A second circuit is electrically coupled to a second read transducer having a tunnel valve structure. An area of a tunnel barrier portion of the second read transducer along a plane of deposition thereof is larger than an area of a tunnel barrier portion of the first read transducer along a plane of deposition thereof.

An apparatus according to another embodiment includes a module having a first read transducer and a second read transducer, the first and second read transducers each having a tunnel valve structure. An area of a tunnel barrier portion of the second read transducer along a plane of deposition thereof is larger than an area of a tunnel barrier portion of the first read transducer along a plane of deposition thereof. A parallel circuit is coupled to the first read transducer. A second circuit is coupled to the second read transducer.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 10A is a top wafer level view of an apparatus according to one embodiment.

FIG. 10B is a top bearing surface view of an apparatus including shields according to one embodiment.

FIG. 10C is a detailed view taken from Circle 10C of FIG. 10B.

FIG. 10D is a detailed view taken from Circle 10D of FIG. 10B.

DETAILED DESCRIPTION

Figure 1A:
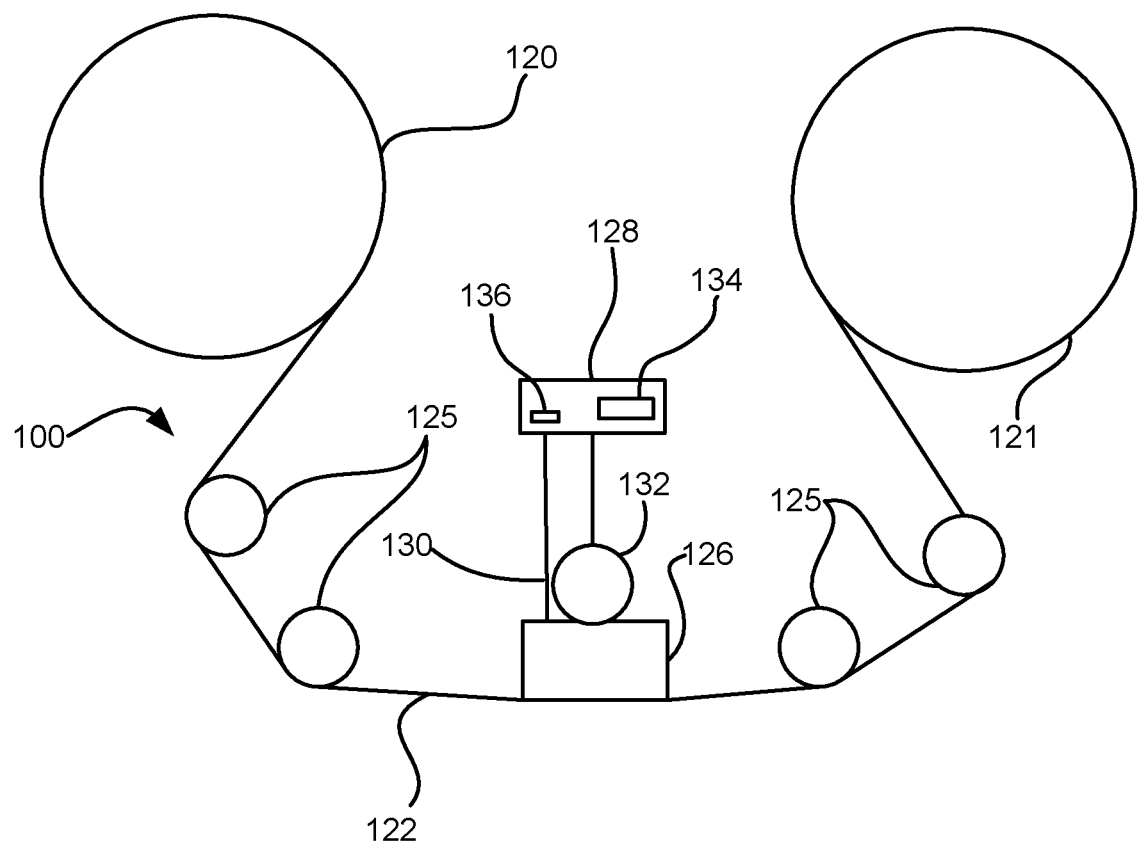
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a plurality of first circuits, each first circuit comprising a pair of terminals coupled to a first read transducer and a first parallel circuit, each first read transducer having a tunnel valve structure having a resistance. A terminal resistance of each first circuit is less than the resistance of the first read transducer thereof. A second circuit has a pair of terminals that are coupled to a second read transducer having a tunnel valve structure. An area of a tunnel barrier portion of the second read transducer along a plane of deposition thereof is larger than an area of a tunnel barrier portion of each of the first read transducers along a plane of deposition thereof. A resistivity of a tunnel barrier of each of the first read transducers is about the same as a resistivity of a tunnel barrier layer of the second read transducer. The terminal resistance of each first circuit is less than about five times a terminal resistance of the second circuit.

In another general embodiment, an apparatus includes a module having an array of first read transducers and a second read transducer, the first and second read transducers each having a tunnel valve structure. An area of a tunnel barrier portion of the second read transducer along a plane of deposition thereof is larger than an area of a tunnel barrier portion of each of the first read transducers along a plane of deposition thereof. A parallel circuit is coupled to each of the first read transducers. A cable couples the first and second read transducers to a controller, thereby forming a plurality of circuits extending from the controller, each circuit corresponding to one of the read transducers. A terminal resistance of each circuit corresponding to the first read transducers is less than about five times a terminal resistance of the circuit corresponding to the second read transducer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128 may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
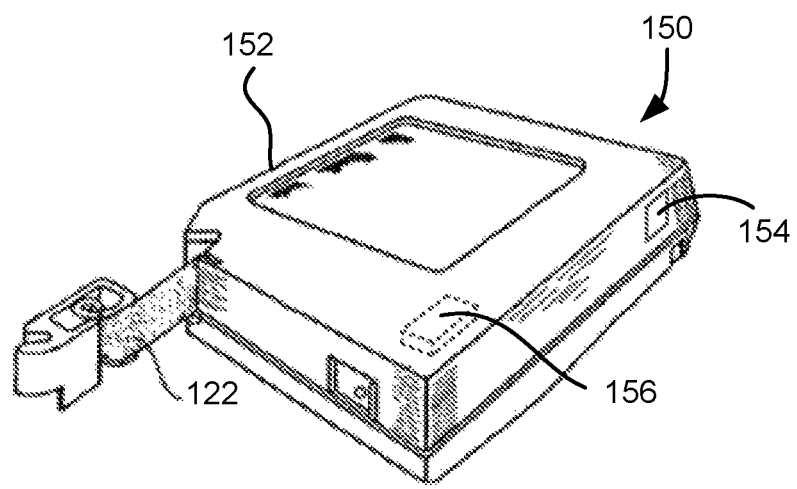
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or another device.

Figure 2A:
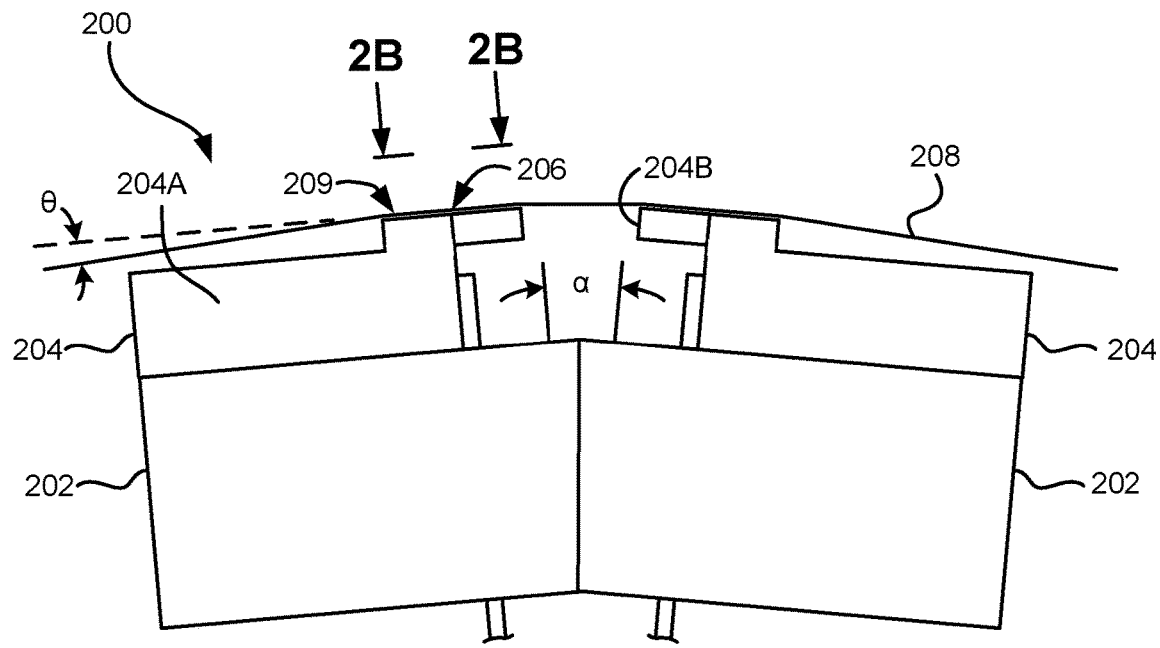
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
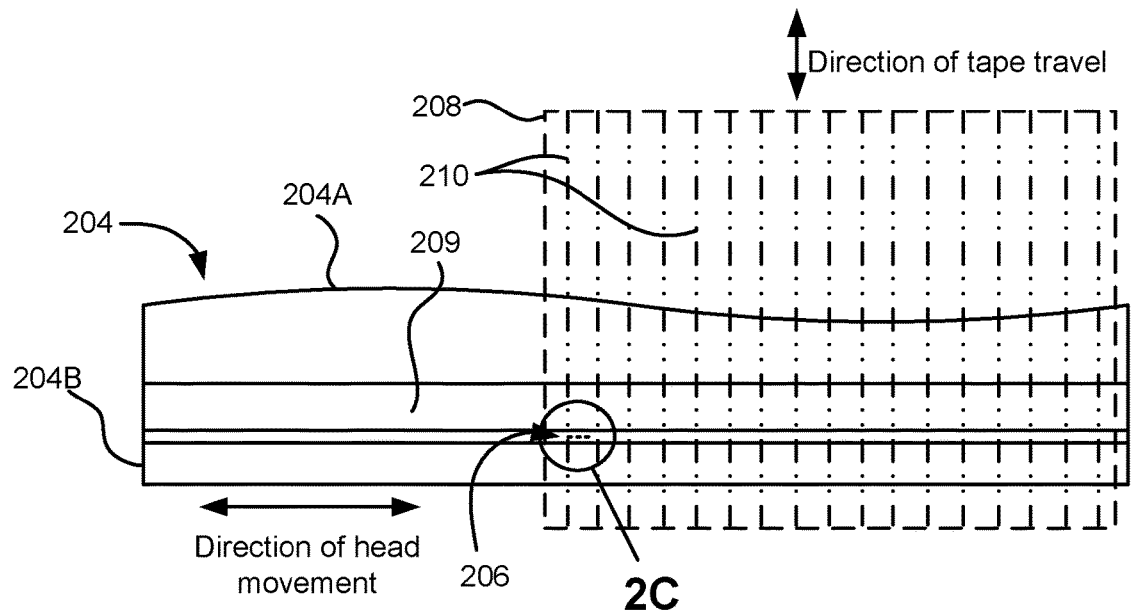
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
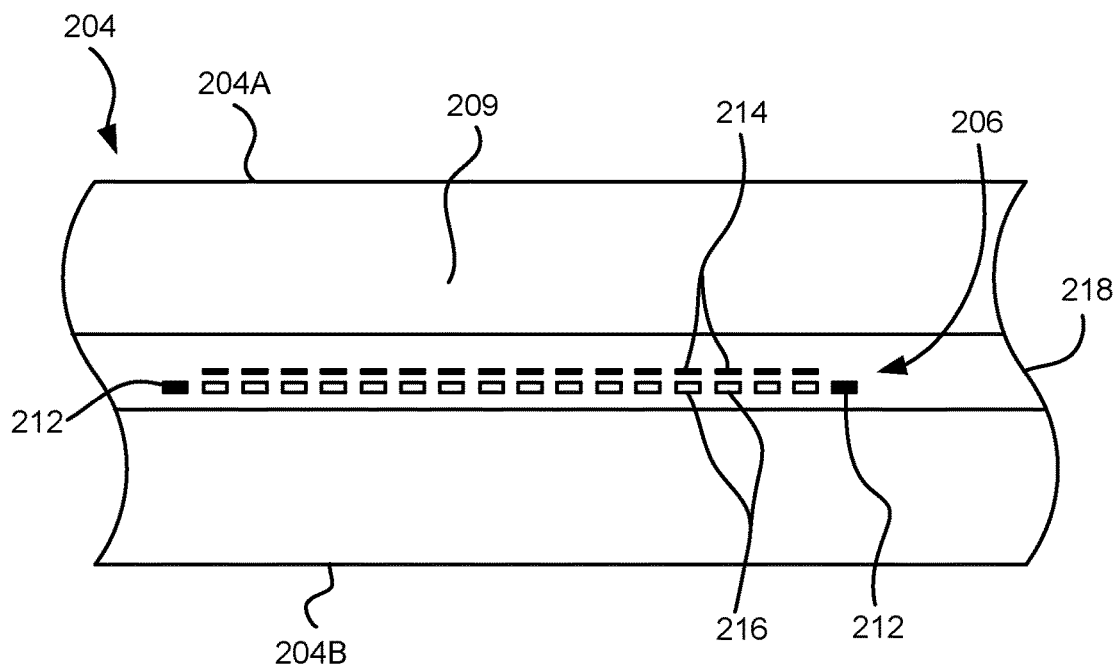
FIG. 2C is a detailed view taken from Circle 2C of FIG. 2B.

FIG. 2C depicts a plurality of readers and/or writers 206 formed in a gap 218 on the module 204 in Circle 2B of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
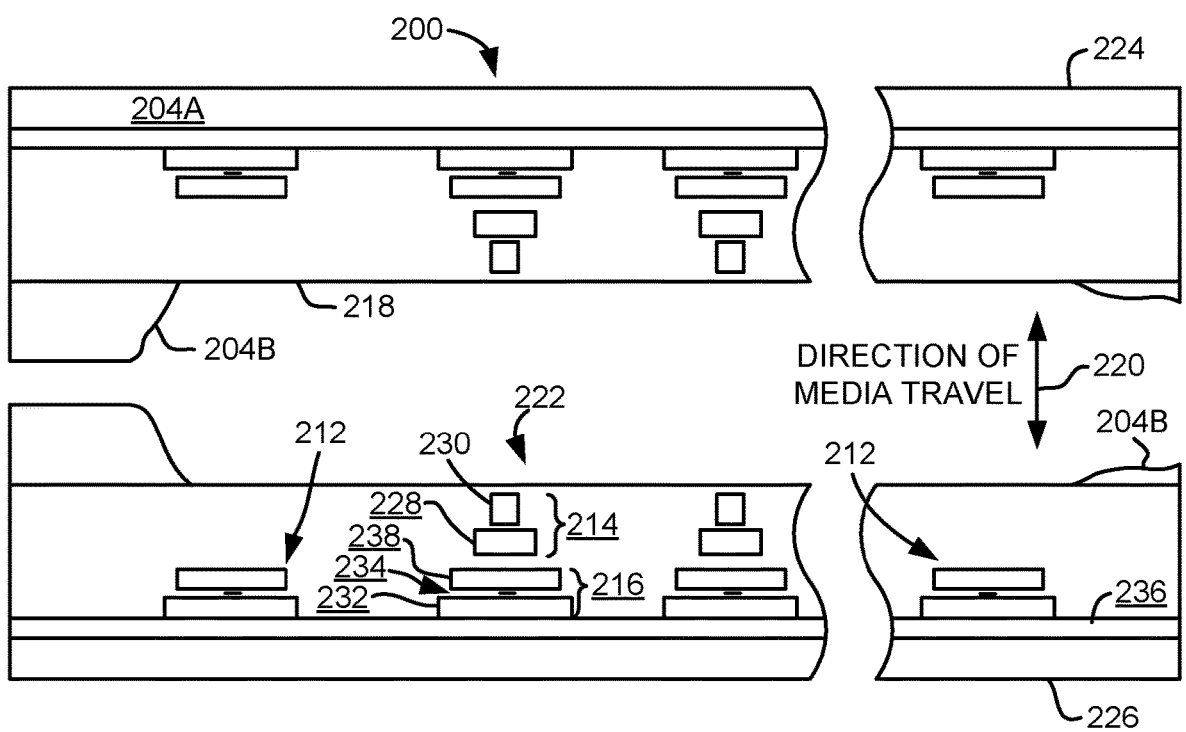
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (referred to as tunnel valve and TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
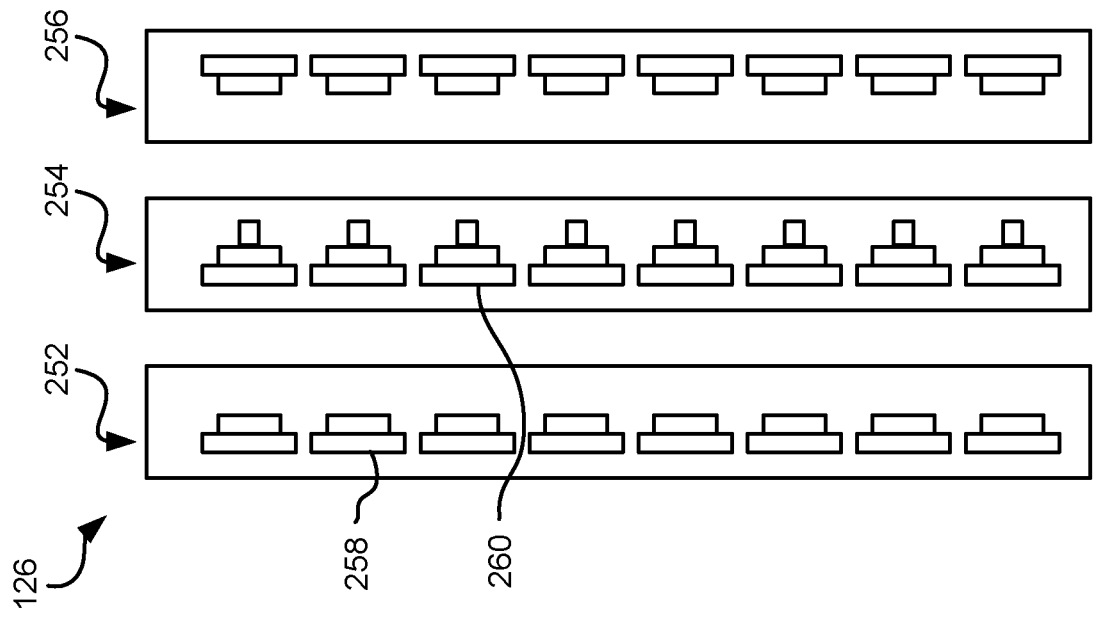
FIG. 4 is a partial tape bearing surface view of a magnetic head having a read-write-read configuration.
Figure 3:
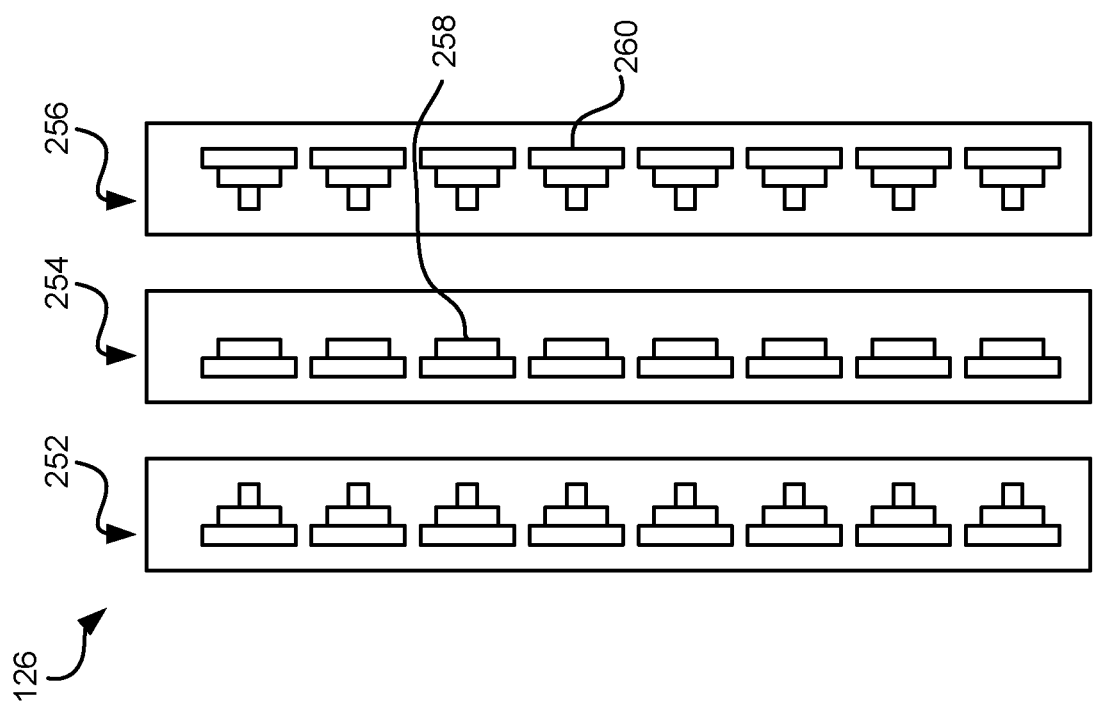
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
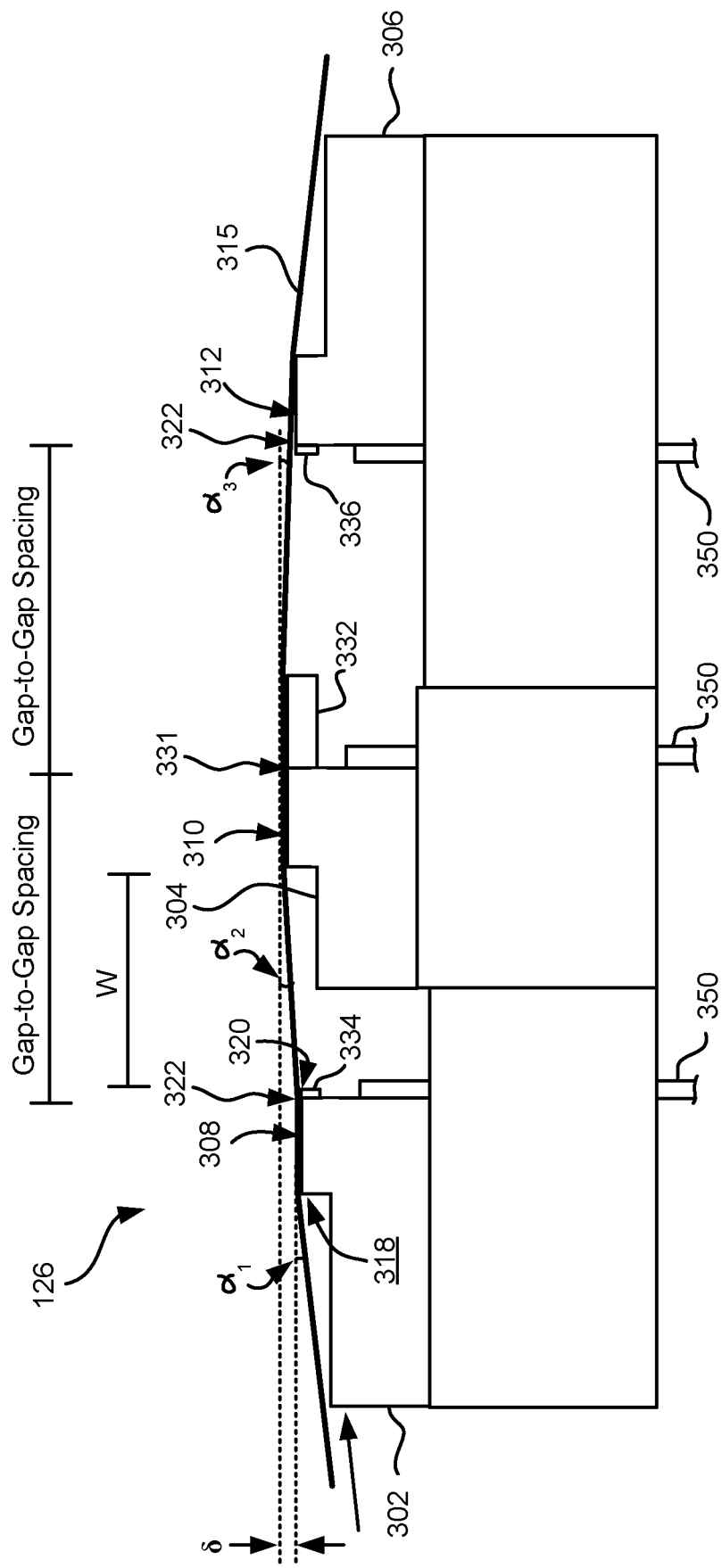
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also, note that the outer modules 302, 306 will alternate as leading modules, depending on the direction of travel of the tape 315.

Figure 6:
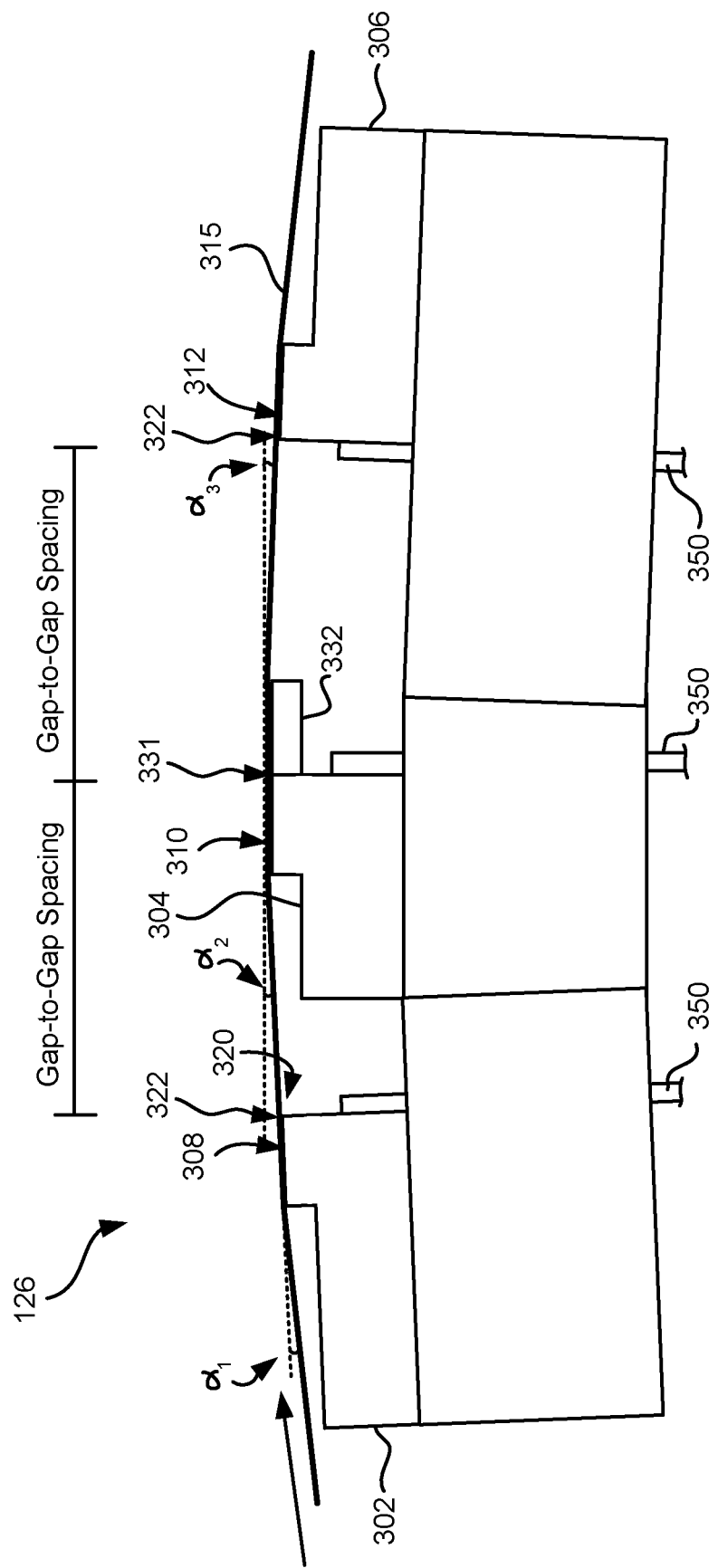
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used Linear Tape Open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
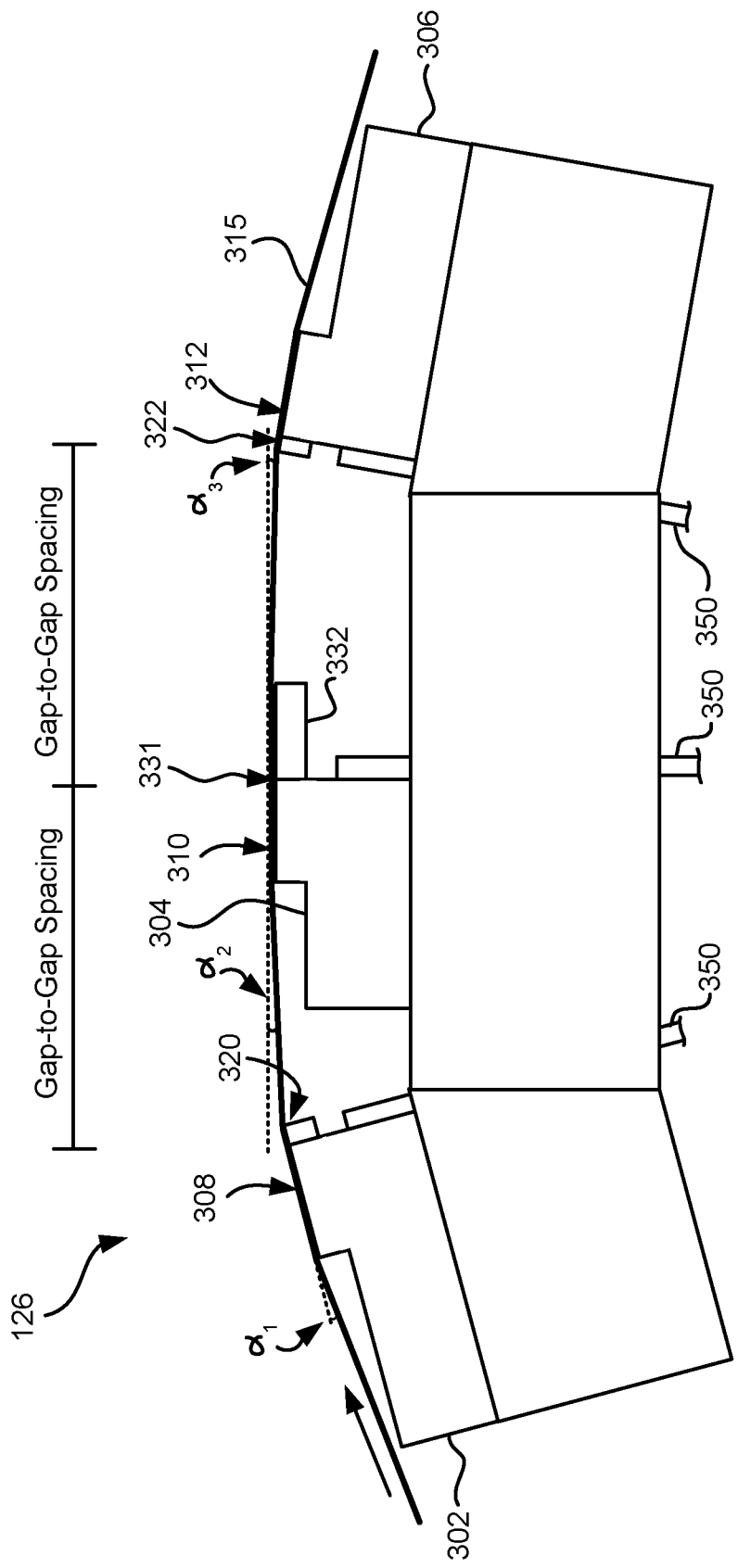
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
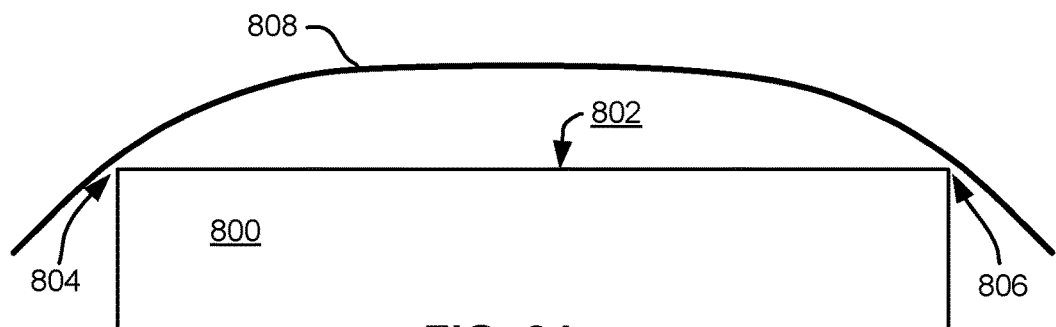
FIGS. 8A-8C are schematics depicting the principles of tape tenting.
Figure 8B:
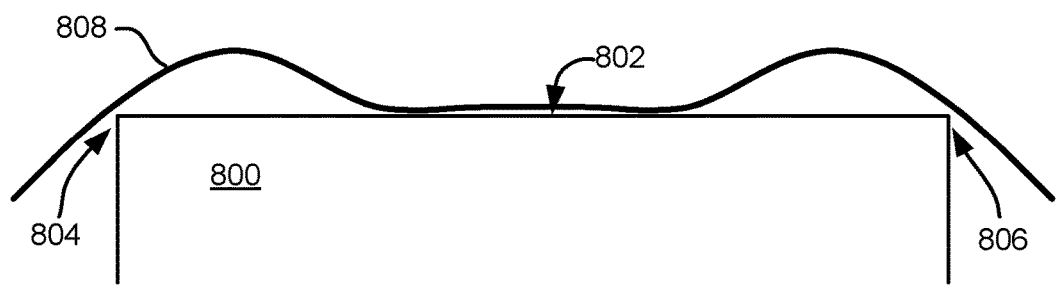
Figure 8C:
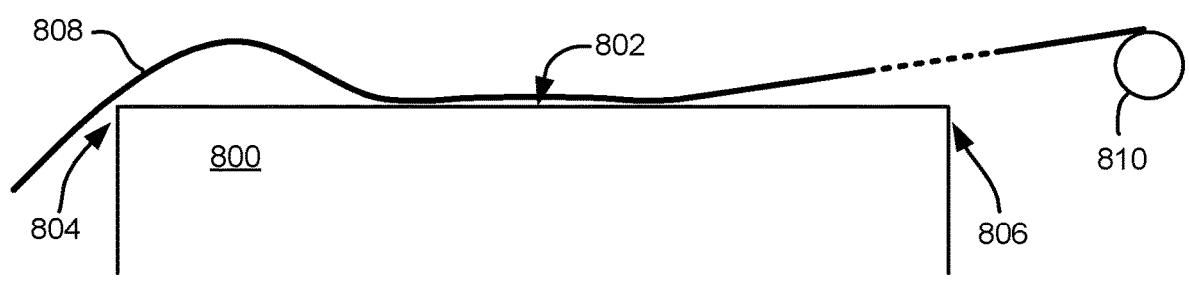

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
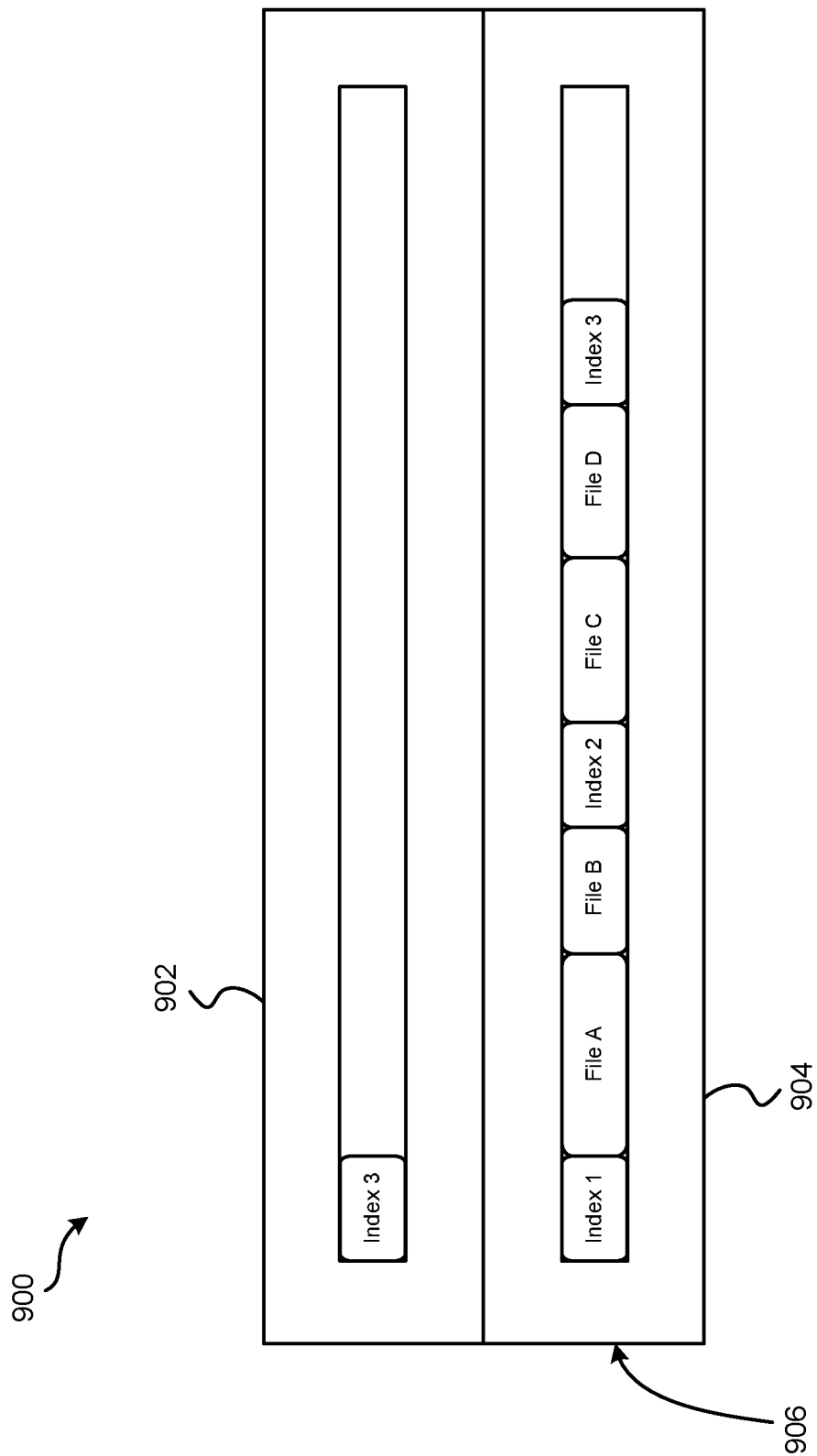
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As data density increases, track widths are reduced to accommodate more tracks per tape for more data. Thus, the data readers become smaller to fit the decreasing widths of the tracks. However, in conventional tape recording heads, servo track readers (see FIGS. 2A-2C) tend to have a larger size for reading servo data on the medium. The size of the servo track readers has changed very little from generation to generation of medium. For example, the dimensions of the servo pattern of the standard LTO-compliant tape has had minimal changes since the first generation of LTO in the year 2000 to the $7^{th}$ generation (in 2015).

Conventional methods to build the tunnel valve sensors involve blanket depositions to create these tunnel valve structures, and the depositions are common (i.e., the same) for both data and servo elements. Thus, the data and servo elements may be built concurrently with the same materials and processes. With increasing numbers of tracks, because the track widths are reduced, the data reader dimensions are also reduced. For efficient data reading, the reader widths are adjusted according to track width. When data reader dimensions are reduced to enable reading smaller track widths that are required for high density recording, tunnel barrier resistivity may also be reduced to preserve data reader resistances.

Tunnel barrier resistivity may be calculated according to Equation 1.

$$R=RA/(w \times h) \qquad \text{Equation 1}$$

The tunnel valve sensor resistance R is equal to the RA of the tunnel valve barrier divided by the product of the sensor height (h) and sensor width (w). RA is the tunnel barrier resistivity in ohms·area ($\Omega\mu m^2$)

For example, if a data sensor has an RA of 4 $\Omega\mu m^2$ and sensor dimensions of w=0.2 µm, h=0.2 µm, then the data sensor resistance (R)=100Ω. On the other hand, servo readers may have w=2 µm and h=0.6 µm with R=3.3Ω. But R may preferably be 30-80Ω in some embodiments. Thus, RA for servo readers would need to be about 40-60 $\Omega\mu m^2$.

Servo reader dimensions have historically remained constant. Conventional servo readers are constrained to have widths in the 2 µm range to accommodate position error signaling issues and backward compatibility with earlier generation of products. Thus, in conventional heads, a RA of 4 $\Omega\mu m^2$, but with servo reader dimensions of w=2.0 µm, h=0.6 µm, the servo resistance (R) would be 3.3Ω, and thus, too low for signal processing of the servo signal.

There are no known solutions to this problem for servo readers in a multichannel reading module having tunnel valve transducers.

Various embodiments described herein include using the same material, or material with similar RA values, for the tunnel barrier layers of both the data sensors and the servo sensors. In some approaches, this allows the servo reader resistance to remain about the same from generation to generation while the resistance in the data reader circuits may be increased, thereby enabling narrower reader width heads having acceptable resistance values.

One embodiment of an apparatus includes a first read transducer having a tunnel valve structure, and a second read transducer having a tunnel valve structure. Furthermore, the tunnel valve structure of the first read transducer has about the same resistivity (within 10%) as the tunnel valve structure of the second read transducer.

FIGS. 10A-10D depict an apparatus 1000 of a magnetic recording module having tunnel valve sensors with similar tunnel barrier resistivities, in accordance with one embodiment. As an option, the present apparatus 1000 may be implemented in conjunction with features from any other embodiment listed herein, such as those described with reference to the other FIGS. Of course, however, such an apparatus 1000 and others presented herein may be used in various applications and/or in permutations which may or may not be specifically described in the illustrative embodiments listed herein. Further, the apparatus 1000 presented herein may be used in any desired environment.

FIG. 10A shows a wafer level view of an embodiment of apparatus 1000. According to one embodiment, the first read transducer 1012 has a tunnel valve structure 1006 and a second read transducer 1010 has a tunnel valve structure 1004. For example, the first read transducers may be data readers, while the second read transducers may be servo readers, e.g., as shown in FIG. 10A. However, as noted below e.g., with reference to FIGS. 13A-13C, the first and second read transducers may be present in various combinations of data readers only, data readers and servo readers, etc.

In one embodiment of apparatus 1000, the read transducers 1010, 1012, in an array 1001, etc. may be in a magnetic tape head. Furthermore, in some approaches, apparatus 1000 includes a drive mechanism for passing a magnetic medium over the read transducers (e.g., as illustrated in FIG. 1A); and a controller (e.g., 128 in FIG. 1A) electrically coupled to the read transducers.

FIG. 10B shows a tape bearing surface view of the apparatus 1000. According to one embodiment, the first read transducer 1012 has a tunnel valve structure 1006 with a bottom shield 1008, a top shield 1009, and electrically conductive spacer layers 1011 between each shield and the associated read transducer. Looking to the magnified view (Circle 10D) of the tunnel valve structure 1006 in FIG. 10D, the tunnel valve structure 1006 may have an antiferromagnetic layer 1014, a reference layer 1016 (such as a synthetic pinned layer structure having antiparallel-pinned layers), a tunnel barrier layer 1024, a free layer 1020, and a sensor cap 1022. In some approaches, the tunnel valve structure 1006 may have more thin film layers. In other approaches, the tunnel valve structure 1006 may have less thin film layers.

According to one embodiment of apparatus 1000, the tunnel valve structure 1006 may include basically anything between the spacer layers 1011 which provide a nonmagnetic electrical connection to the shields, and excluding layers along the side edges of the trimmed sensor stack (e.g., excluding hard bias layers 1002 and insulating layers 1026, as shown in FIGS. 10C and 10D, etc.).

According to one embodiment of apparatus 1000, a second read transducer 1010 may be on the same module as the first read transducer 1012, the second read transducer 1010 having a tunnel valve structure 1004, where the tunnel valve structure 1006 of the first read transducer 1012 has about the same resistivity as the tunnel valve structure 1004 of the second read transducer 1010. A slight difference in resistivity may be present due to process variations, even though the tunnel barrier layers are formed concurrently in the same processing step. Conventional materials may be used to fabricate the tunnel barrier layers, such as magnesium oxide.

Looking to a magnified view (Circle 10C) of the tunnel valve structure 1004 of the second read transducer 1010, as shown in FIG. 10C, the tunnel valve structure 1004 may have an antiferromagnetic layer 1014, a reference layer 1016 (including a synthetic pinned layer structure having antiparallel-pinned layers), a tunnel barrier layer 1018, a free layer 1020, and a sensor cap 1022. In some approaches, the tunnel valve structure 1004 may have more thin film layers. In other approaches, the tunnel valve structure 1004 may have less thin film layers.

In various embodiments of apparatus 1000, and as shown in the magnified views of FIGS. 10C and 10D, the tunnel valve structure 1006 of the first read transducer 1012 may have a tunnel barrier layer 1024 that has about the same resistivity as the tunnel barrier layer 1018 of the tunnel valve structure 1004 of the second read transducer 1010. However, an area of the tunnel barrier portion of the second read transducer 1010 along a plane of deposition thereof may be larger than an area of the tunnel barrier portion of each of the first read transducers 1012 along a plane of deposition thereof, such as when the first read transducers are data transducers and the second read transducers are servo transducers. For example, the area of the tunnel barrier portion of the second read transducer may be two times the area of the tunnel barrier portion of each first read transducer, or greater. Heights of the tunnel barrier portions of the each first read transducers 1012 may be about the same as the height of the tunnel barrier portion of the second read transducer 1010. However, in some approaches, each first read transducer 1012 may have a lesser height than the second read transducer 1010.

Due to the relatively different areas of the tunnel barrier layers of the first and second read transducers, the overall resistance of the first read transducer, e.g., as measured across the upper and lower leads (e.g., shields) of the first read transducer, is higher than the overall resistance of the second read transducer when measured in a similar manner. See Equation 1, above.

Figure 11:
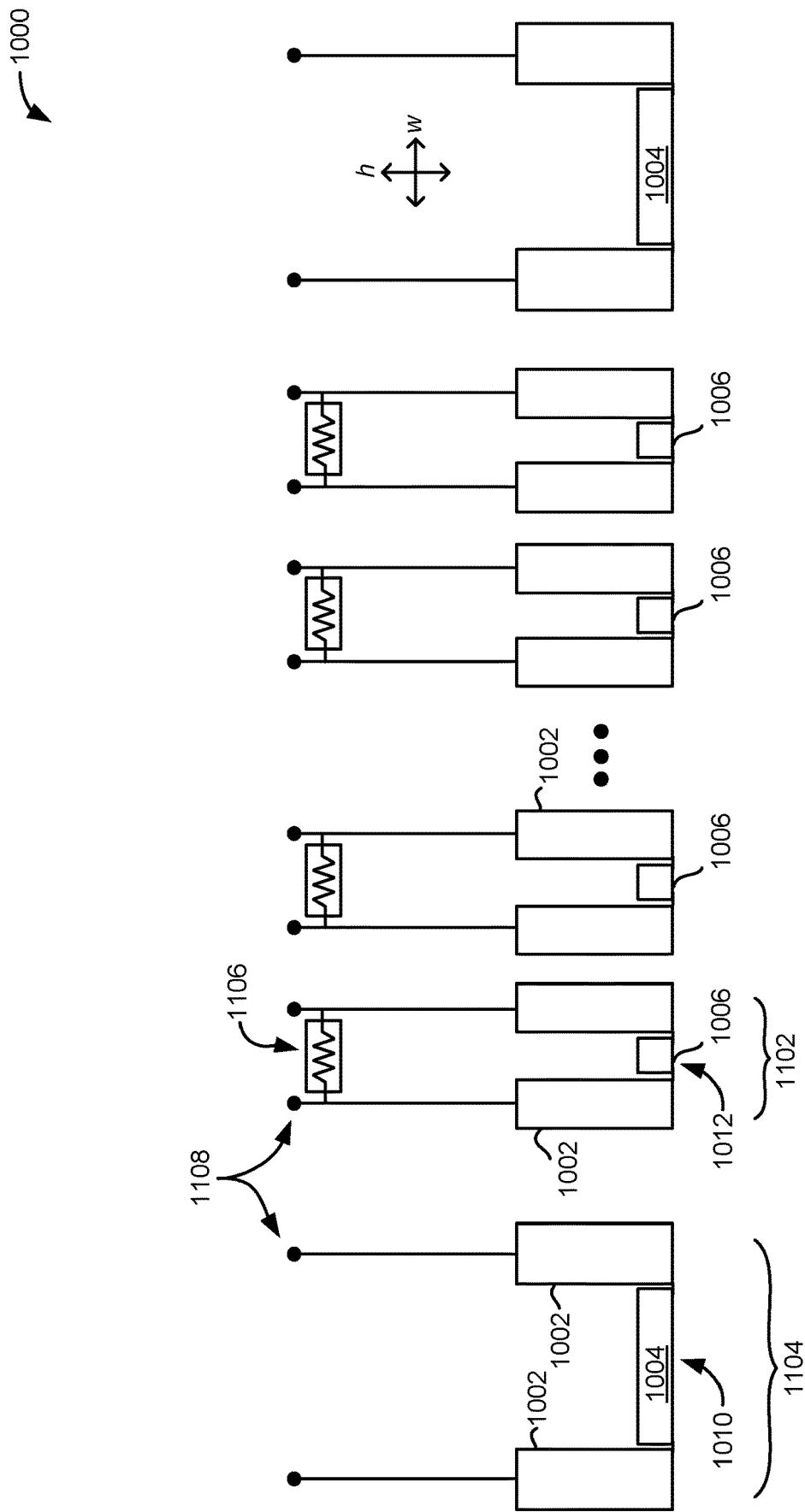
FIG. 11 is a representative view of an apparatus according to one embodiment.

Referring to FIG. 11, which depicts an embodiment of apparatus 1000, the first read transducers 1012 are each part of a respective first circuit 1102, while the second read transducers 1010 are each part of a respective second circuit 1104.

Each first circuit 1102 has a parallel circuit 1106 electrically coupled to the associated first read transducer 1012. A terminal resistance, as measured at the terminals 1108 of each first circuit 1102, is less than the resistance of the first read transducer 1006 of the respective first circuit 1102. In general, a terminal resistance as described herein are measured at distal ends of the described circuit, e.g., as measured at pads at the end of the cable positioned farthest from the transducers.

The second circuits 1104 may or may not have a parallel circuit electrically coupled to the associated second read transducer 1010. Preferably, the second circuits 1104 do not have a parallel circuit. If the second circuit 1104 has a parallel circuit, the resistance of the second parallel circuit may be different than a resistance of each of the parallel circuits of the first circuits.

The parallel circuits may each include one or more resistors, e.g., of conventional construction. The various parallel circuits may also and/or alternatively have any other construction using conventional components to provide the desired terminal resistance for the circuit.

The resistance value of each parallel circuit 1106 is preferably a value that results in the terminal resistance of each first circuit 1102, as measured at the terminals 1108 thereof, being less than about five times the terminal resistance of the second circuit 1104 as measured at terminals 1108 located at the distal end of the second circuit. More preferably, the resistance value of each parallel circuit 1106 is a value that results in the terminal resistance of each first circuit 1102 being less than about two times the terminal resistance of the second circuit 1104 as measured at the terminals 1108 of the respective circuit. In some approaches, the resistance value of each parallel circuit 1106 is a value that results in the terminal resistance of each first circuit 1102 being within about 10% of the terminal resistance of the second circuit 1104 as measured at the terminals 1108 of the respective circuit. Accordingly, the resistance value of each parallel circuit may be dependent upon the properties of the various components of the apparatus, and thus may be readily calculated using known formulae and design values for the various components of the apparatus.

In various embodiments, the parallel circuits may be located in the respective circuits at any suitable location.

In one embodiment, the first and second circuits 1102, 1104 include leads extending from the respective transducer to pads on a module. The pads may be the terminals in some embodiments. The first and second circuits may be integrated in a module. The parallel circuits may be formed when leads are formed. In some approaches, the parallel circuits may be external to thin films that are part of the respective transducer stack.

In another embodiment, the parallel circuits are coupled to an exterior of a module, i.e., the parallel circuits are separate components from the module.

The first and second circuits 1102, 1104 may further include leads of a cable in electrical communication with the transducers. The terminals at the distal ends of the first and second circuits 1102, 1104 may be the leads or pads at the end of the cable farthest from the transducers. For example, the parallel circuits may be embodied in an interposer located at one end of the cable or the other and interposed between the cable and the proximal component. The interposer may be in the form of a chip, circuit board, etc. In another example, the parallel circuits may be embodied in a chip coupled to pads of a module, pads or leads of a cable, etc.

In yet another approach, the parallel circuits are coupled directly to leads of a cable, and can be positioned toward either end of the cable. One example is a silicon resistor array coupled to leads or pads of the cable. Preferably, in such approach, the parallel circuits are coupled directly to the leads of the cable toward an end of the cable located closest to the read transducers.

In yet another embodiment, the parallel circuits are located on a circuit board to which the cable is attached. For example, the circuit board may be part of a tape drive controller.

Figure 12:
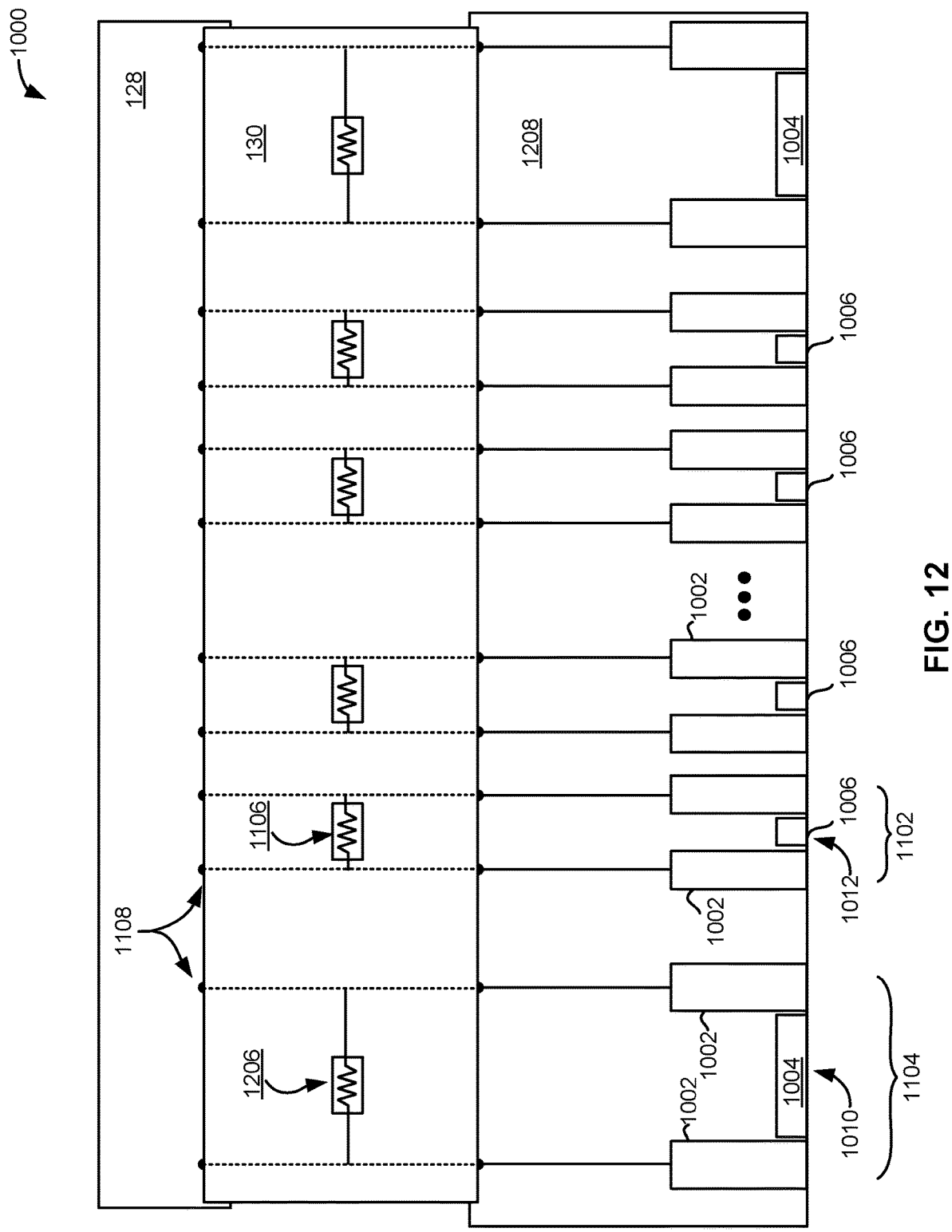
FIG. 12 is a representative view of an apparatus according to one embodiment.

FIG. 12 illustrates an embodiment of the apparatus 1000, where the apparatus 1000 includes a controller 128 and a cable 130 coupling the read transducers 1010, 1012 to the controller 128, thereby forming a plurality of circuits 1102, 1104 corresponding to one of the transducers 1010, 1012 and extending from the controller 128. Each circuit has terminals 1108 electrically coupled to the controller at the distal ends of the respective circuit. A parallel circuit 1206 is also shown in each second circuit 1104. The read transducers 1010, 1012 are embodied in a module 1208.

Again, the depicted location of the parallel circuits 1106, 1206 is exemplary only. For example, the parallel circuits 1106 and/or 1206 may be embodied in an interposer positioned between the cable 130 and module 1208 and/or between the cable 128 and controller 128; on the circuit board of the controller 128; etc.

Track widths for data readers may change from generation to generation of tape recording products. Thus, various embodiments described below allow different data reader widths to accommodate changing track widths and various formats. Magnetic tape heads may be formed with data readers aligned according to a specification format to read multiple generations of tapes with different track widths. In addition, new generations may require more channels.

Figure 13A:
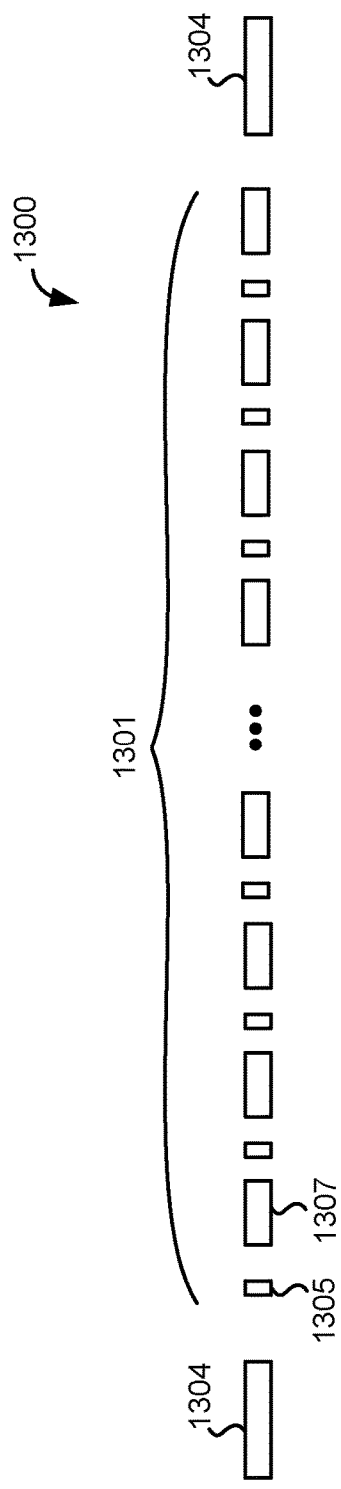
FIG. 13A is a bearing surface view of an apparatus according to one embodiment.
Figure 13B:
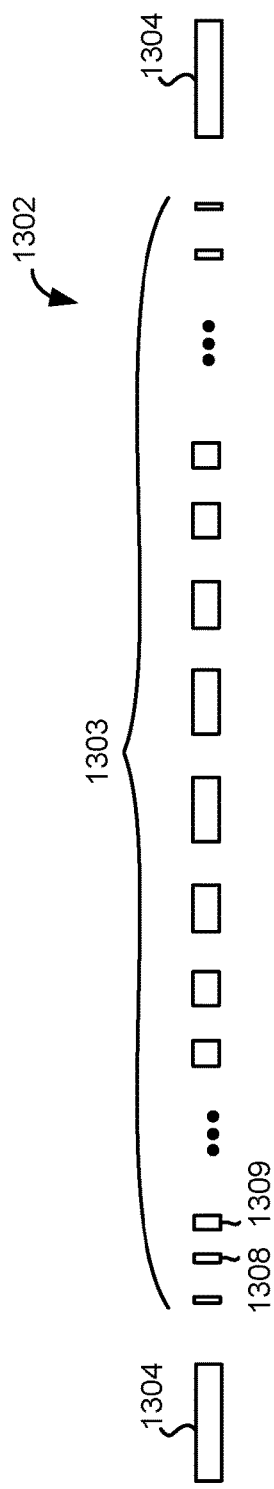
FIG. 13B is a bearing surface view of an apparatus according to one embodiment
Figure 13C:
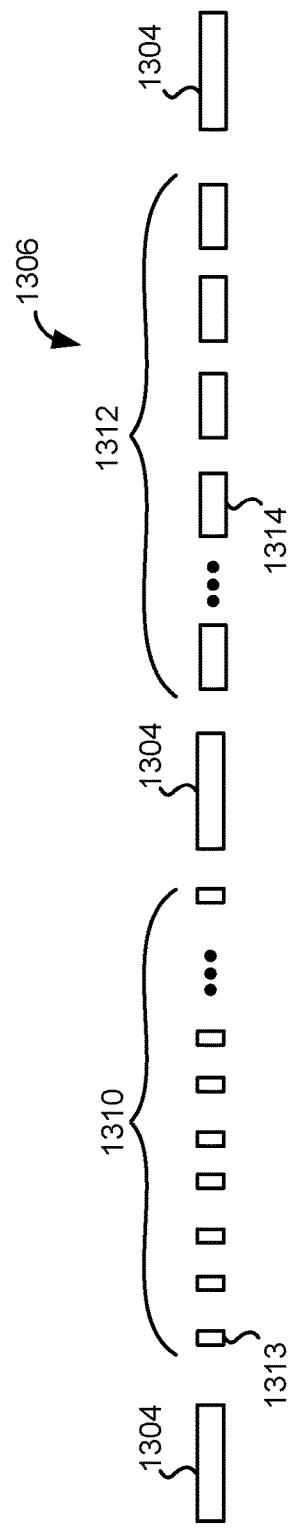
FIG. 13C is a bearing surface view of an apparatus according to one embodiment.

FIGS. 13A-13C depict apparatuses 1300, 1302, 1306 having tunnel valve sensors with similar tunnel barrier resistivities but different areas, in accordance with one embodiment. As an option, present apparatuses 1300, 1302, 1306 may be implemented in conjunction with features from any other embodiment listed herein, such as those described with reference to the other FIGS. Of course, however, such apparatuses 1300, 1302, 1306 and others presented herein may be used in various applications and/or in permutations which may or may not be specifically described in the illustrative embodiments listed herein. Further, the apparatuses 1300, 1302, 1306 presented herein may be used in any desired environment.

In one embodiment of apparatus 1300 as shown in FIG. 13A, the first read transducer may be a first data reader 1305 and the second read transducer may be a second data reader 1307. According to one embodiment of apparatus 1300, a first read transducer 1305 may be on a same module as the second read transducer 1307, the second read transducer 1307 having a tunnel valve structure, where the tunnel valve structure of the first read transducer 1305 has a similar resistivity than the tunnel valve structure of the second read transducer 1307. In some approaches, as shown in FIG. 13A, the data readers of the array 1301 may be an alternating (interleaved) pattern of a second data reader 1307 for one generation of tape and a first data reader 1305 for a later generation of tape format. In some approaches, the first and second data readers may operate together to read a later generation of tape format.

In various embodiments, the width of the tunnel barrier layer of the tunnel valve structure may vary within an array of data readers. For example, according to one embodiment of apparatus 1302, FIG. 13B illustrates an array 1303 of data readers with different widths of tunnel barrier layers for each data reader. In some approaches, the resistivity of the tunnel valve structure of the second data reader 1308 may have a different width of tunnel barrier layer of the third data reader 1309, and so on with each width different in an array 1303. In the example shown, the widths of the data readers progressively decrease from the center of the array toward the ends of the array. This may be done to address track misregistration due to tape dimensional instability.

An example of another embodiment of a multiformat apparatus may have multiple arrays of the data readers and/or servo readers having similar resistivities, for example, in a multi-format head having multiple arrays. As illustrated in FIG. 13C, array 1310 may have data readers 1313 of different resistivities than the data readers 1314 in array 1312, where, for example, each array is designed for a different tape format. In apparatus 1306, the two arrays 1310, 1312 of data readers may be flanked by servo readers 1304 on either side of the arrays 1310, 1312. The servo readers 1304 may have different resistivities from the data readers 1313, 1314 in the arrays 1310, 1312.

In various embodiments, e.g., any of the foregoing embodiments, the second read transducer and another second read transducer may be aligned with a longitudinal axis of the array.

It will be clear that the various features of the foregoing systems and/or methodologies may be combined in any way, creating a plurality of combinations from the descriptions presented above.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a first circuit electrically coupled to a first read transducer and a first parallel circuit, the first read transducer having a tunnel valve structure having a resistance; and
a second circuit electrically coupled to a second read transducer having a tunnel valve structure,
wherein an area of a tunnel barrier portion of the second read transducer along a plane of deposition thereof is larger than an area of a tunnel barrier portion of the first read transducer along a plane of deposition thereof,
wherein a resistance of the second circuit is different than a resistance of the first circuit.

2. An apparatus as recited in claim 1, wherein a resistivity of a tunnel barrier of the first read transducer is about the same as a resistivity of a tunnel barrier layer of the second read transducer.

3. An apparatus as recited in claim 1, wherein the first read transducer is a data reader, wherein the second read transducer is a servo reader.

4. An apparatus as recited in claim 1, wherein the area of the tunnel barrier portion of the second read transducer is at least two times the area of the tunnel barrier portion of the first read transducer.

5. An apparatus as recited in claim 1, wherein the first read transducer has a greater height than the second read transducer.

6. An apparatus as recited in claim 1, comprising a plurality of the first read transducers, wherein the first read transducers are arranged in an array, wherein the second read transducer is aligned with a longitudinal axis of the array.

7. An apparatus as recited in claim 1, wherein the first read transducer is a first data reader, wherein the second read transducer is a second data reader.

8. An apparatus as recited in claim 1, wherein the first and second read transducers are in a magnetic tape head.

9. An apparatus as recited in claim 1, wherein the first parallel circuit is coupled to an exterior of a module.

10. An apparatus as recited in claim 1, wherein the first parallel circuit is coupled directly to leads of a cable.

11. An apparatus as recited in claim 10, wherein the first parallel circuit is coupled directly to the leads of the cable toward an end of the cable located closest to the first and second read transducers.

12. An apparatus as recited in claim 1, wherein the first and second circuits are integrated in a module.

13. An apparatus as recited in claim 1, wherein the first parallel circuit is located on a circuit board to which a cable is attached.

14. An apparatus as recited in claim 1, wherein the second circuit comprises a second parallel circuit coupled to the second read transducer, wherein a resistance of the second parallel circuit is different than a resistance of the first parallel circuit.

15. An apparatus as recited in claim 1, further comprising:
a drive mechanism for passing a magnetic medium over the first and second read transducers.

16. An apparatus, comprising:
a module having a first read transducer and a second read transducer, the first and second read transducers each having a tunnel valve structure,
wherein an area of a tunnel barrier portion of the second read transducer along a plane of deposition thereof is larger than an area of a tunnel barrier portion of the first read transducer along a plane of deposition thereof,
a parallel circuit coupled to the first read transducer; and
a second circuit coupled to the second read transducer,
wherein a resistance of the second circuit is different than a resistance of the parallel circuit.

17. An apparatus as recited in claim 16, wherein a resistivity of a tunnel barrier portion of the first read transducer is about the same as a resistivity of a tunnel barrier portion of the second read transducer.

18. An apparatus as recited in claim 16, wherein an area of the tunnel barrier portion of the second read transducer is at least two times an area of the tunnel barrier portion of the first read transducer.

19. An apparatus as recited in claim 16, wherein the first and second read transducers are in a magnetic tape head.

* * * * *